US007899831B2

(12) United States Patent
Drory et al.

(10) Patent No.: US 7,899,831 B2
(45) Date of Patent: Mar. 1, 2011

(54) METHOD AND SYSTEM FOR FOLDER RECOMMENDATION IN A FILE OPERATION

(75) Inventors: Tal Drory, Haifa (IL); David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/054,411

(22) Filed: Mar. 25, 2008

(65) Prior Publication Data

US 2009/0248615 A1    Oct. 1, 2009

(51) Int. Cl.
*G06F 17/30* (2006.01)
(52) U.S. Cl. ........................ 707/751; 707/768
(58) Field of Classification Search ............ 707/751, 707/768
See application file for complete search history.

(56) References Cited

U.S. PATENT DOCUMENTS

| | | | |
|---|---|---|---|
| 7,233,997 B1* | 6/2007 | Leveridge et al. | 709/229 |
| 2003/0182331 A1 | 9/2003 | Demsky et al. | |
| 2006/0031340 A1 | 2/2006 | Mathew et al. | |
| 2006/0080278 A1* | 4/2006 | Neiditsch et al. | 707/1 |
| 2006/0277195 A1* | 12/2006 | Schulz et al. | 707/10 |
| 2007/0067353 A1* | 3/2007 | Cheng et al. | 707/201 |
| 2009/0012984 A1* | 1/2009 | Ravid et al. | 707/101 |

OTHER PUBLICATIONS

File Dudes, "Outlook Express attachment extractor 1.45" http://www.filedudes.com/Outlook_Express_Attachment_Extractor-download-18713.html.
SwiftFile for Notes, IBM Resarch. http://www.research.ibm.com/swiftfile/.

* cited by examiner

*Primary Examiner*—Neveen Abel Jalil
*Assistant Examiner*—Son T Hoang

(57) ABSTRACT

Folder recommendation in a file operation is accomplished by: receiving (325) information relating to the file operation; providing history data (321) of one or more previous operations, the data including details of information relating to a previous operation and a folder on which the previous operation was performed; and selecting a folder (324) for recommendation including matching the file operation to one or more folders based on the history data. In one embodiment, the operation is an operation of saving a file, and the information relating to the operation is file information. In another embodiment, the operation is an operation of retrieving a file, and the information relating to the operation is destination information.

20 Claims, 7 Drawing Sheets

METHOD AND SYSTEM FOR FOLDER RECOMMENDATION IN A FILE OPERATION

FIELD OF THE INVENTION

This invention relates to the field of computer file management. In particular, the invention relates to folder recommendation in a file operation, including providing folder location options for extracting or retrieving a file from a folder, or saving or sending a file to a folder.

BACKGROUND OF THE INVENTION

Files need to be saved to a folder in a file system or extracted from a folder in a file system in a number of different situations. Situations in which a file is saved to a folder include the following examples: saving a new file which has been created or saving a different version of an existing file in a "Save As" operation; saving a file received as an attachment to an email message; or saving a file downloaded from the Internet. Situations in which a file needs to be selected from a folder include selecting a file for attachment to an email.

In known systems, a browse window for selecting a folder is opened when a "Save As" operation is initiated, for example in a word processor editor application. The folders shown in the browse window may be the last folder a file was saved to, a default folder such as "My Documents", or in some cases a folder for temporary files.

In a related problem, many current email systems make it hard for users to keep the mail attachments they receive within the email messages themselves, either because it increases the mail files or database size and thus makes it harder to manage, or because there is a limit on the total size. Therefore, users tend to extract (save and delete or just save operation) mail attachments and save them in the file system.

When extracting such attachments, the system usually remembers the last folder in which the last attachment was saved, which serves as the default folder for the next "save and delete" operation. Many times this is not the right folder the user really wants to use.

In a further related scenario, when writing an email message and adding an attachment to a messages, a user needs to point to the request file to be attached. A browse window is again opened suggesting a folder from which to retrieve the file to be attached. The suggested folders are often not the most relevant and other folders need to be navigated to before the correct file is located for attachment.

It is an aim of the present invention to suggest a folder to save a file to or to retrieve a file from based on an automatic analysis of past behavior.

SUMMARY OF THE INVENTION

According to a first aspect of the present invention there is provided a method for folder recommendation in a file operation wherein a folder is a file system folder, comprising: receiving information relating to the file operation; providing history data of one or more previous operations, the data including details of information relating to a previous operation and a folder on which the previous operation was performed; selecting a folder for recommendation including matching the file operation to one or more folders based on the history data.

The previous operations may be previous operations with similar information to the current file operation.

In a first embodiment, the operation may be an operation of saving a file to a folder, and wherein the information relating to the operation is file information, the method including: providing history data of previous file save operations, the data including details of previous file information and a folder to which the previous operation was performed; selecting a folder including matching the file save operation to one or more folders based on the history data.

Selecting a folder may include: matching the file save operation to one or more folders based on the number of entries or similar entries of the file information in the history data; and selecting the folder with the highest number of entries. Selecting a folder may further include: selecting a folder by matching the file save operation to one or more folders based on a similarity of the file information to file information within a folder. A folder may be selected with the highest similarity to the file information.

The step of further selecting a folder by matching the file save operation to one or more folders based on a similarity of the file information to file information within a folder, may be carried out if no folders are matched to the file information based on the history data.

In an optional refinement of the first embodiment, the file save operation may be carried out from a source with source information, and the method including: further selecting a folder by matching the file save operation to one or more folders based on the similarity of the source information to file information within a folder.

The step of further selecting a folder by matching the file save operation to one or more folders based on a similarity of the source information to file information within a folder, may be carried out if no folders are matched to the file information based on the history data, and if no folders are matched based on a similarity of the file information to file information within a folder.

In all the steps that use a similarity, a similarity measure may include a distance measurement between texts.

If in any of the methods of selection more than one folder is selected, the folders may be presented in a decreasing order of selection.

The file information may include the file name and file contents, and metadata relating to the file. Where applicable, the source information may include an email message subject, message content, and email addresses for an email message from which a file is extracted for saving to a folder.

In a second embodiment, the operation is an operation of retrieving a file, and wherein the information relating to the operation is destination information, the method including: providing history data of previous file retrieval operations, the data including details of previous destination information and a folder from which the previous operation was performed; selecting a folder including matching the file retrieval operation to one or more folders based on the history data.

Selecting a folder may include: matching the file retrieval operation to one or more folders based on the number of entries or similar entries of the destination information in the history data; and electing the folder with the highest number of entries.

Selecting a folder may further include selecting a folder by matching the file retrieval operation to one or more folders based on the similarity of the destination information to file information within a folder.

The destination information may include an email message subject, message content, and email addresses for an email to which a file is to be selected for attachment.

The method may also include selecting a file from within one or more selected folders by a similarity of file information in a folder to the destination information.

According to a second aspect of the present invention there is provided a computer software product for folder recommendation in a file operation wherein the folder is a file system folder, the product comprising a computer-readable storage medium, storing a computer in which program comprising computer-executable instructions are stored, which instructions, when read executed by a computer, perform the following steps: receiving information relating to the file operation; providing history data of one or more previous operations, the data including details of information relating to a previous operation and a folder on which the previous operation was performed; selecting a folder for recommendation including matching the file operation to one or more folders based on the history data.

According to a third aspect of the present invention there is provided a system including a processor for folder recommendation for a file operation, comprising: means for receiving information relating to the file operation; a history log of data of one or more previous instances of the operation, the data including details of information relating to a previous operation and a folder on which the previous operation was performed; means for matching the file operation to one or more folders based on the history data.

The system may include means for matching the file operation to one or more folders based on the similarity of information relating to the operation to file information within a folder.

The system may further include an index of files and folders, for example, either as provided in a file system or as defined by a user.

The system may also include a graphical user interface for providing a recommendation of one or more selected folders to a user.

The means for receiving information relating to the operation may include one of the groups of: file information for a file save operation; source information for a file save operation; or destination information for a file retrieval operation.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1A:
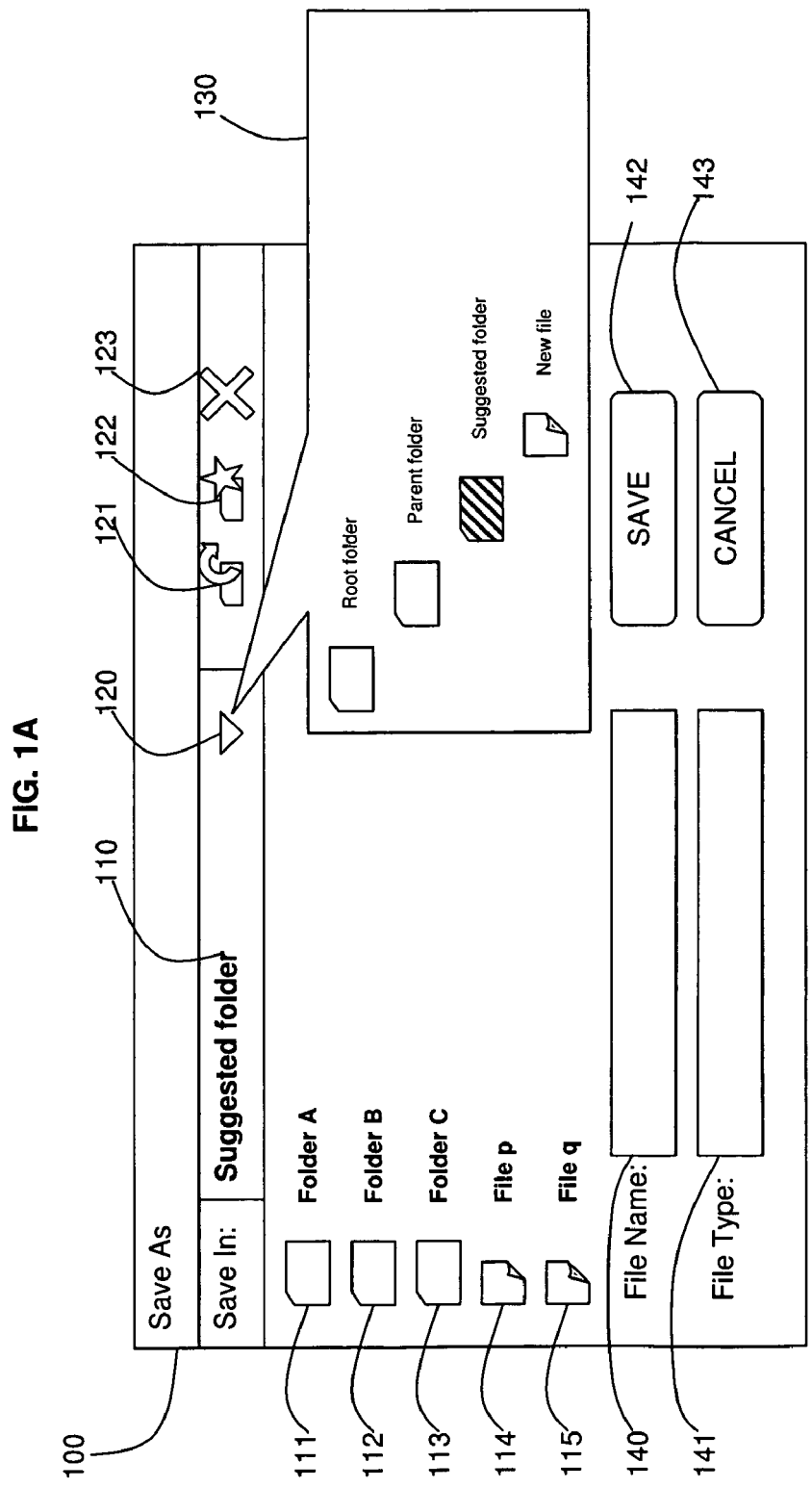
FIG. 1A is an illustration of an embodiment of a graphical user interface for a file browser application as known in the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and a system are provided for folder recommendation for a file operation. The folder may be selected for recommendation in file operations such as saving or sending a file to a folder, or extracting or retrieving a file from a folder. Computer file management manipulates documents and data in files on a computer. A file system on a computer is usually stored in a hierarchy with nested directories and folders for navigation and location of files. A file browser is a computer application which provides a user interface to work with a file system to navigate and located files.

The term "folder" is used for an entity in a file system which contains a group of files and/or other folders. A folder may also be referred to as a directory, catalog or drawer. A typical file system may contain thousands (or even hundreds of thousands) of folders. Files are kept organized by storing related files in the same folder. A folder contained inside another folder is called a subfolder. Together the folders form a hierarchy or tree structure.

File browsers are activated when certain operations are instigated in applications operating on the operating system of the computer.

One example of an operation in which a folder is recommended for a file is a "Save As" operation to save a file in a new location. "Save As" operations are found in various applications including file editors, such as Microsoft Word (Microsoft and Microsoft Word are trade marks of Microsoft Corporation), or IDEs (integrated development environment) such as Eclipse (Eclipse is a trade mark of Eclipse Foundation) or Microsoft Visual Studio, or Internet browser applications. Another example of an operation in which a folder is recommended for a file is a "Send To" operation, where the "Send To" is to a folder. "Send To" operations are also found in various applications including file editors and IDEs. The "Send To" operation may send to a folder or shared folder.

Other example operations include operations in which a folder is recommended for retrieval of a file. An example of such an operation is an "Insert file" operation to locate a file for insertion in, for example, a document or email message. Other operations which activate file browsers include inserting a hyperlink into a document, inserting a picture, etc.

File browsers take many different forms depending on the operating system being used and the file management system. However, most file browsers include the feature of going to a suggested location, such as a suggested folder, when the file browser is activated and showing the suggested location in the user interface. Navigation around the file system is then possible using the user interface features to change the suggested location, as required. This can be time consuming and not user friendly, particularly if repeated operations are carried out and the suggested location is repeatedly not the required location.

Figure 1B:
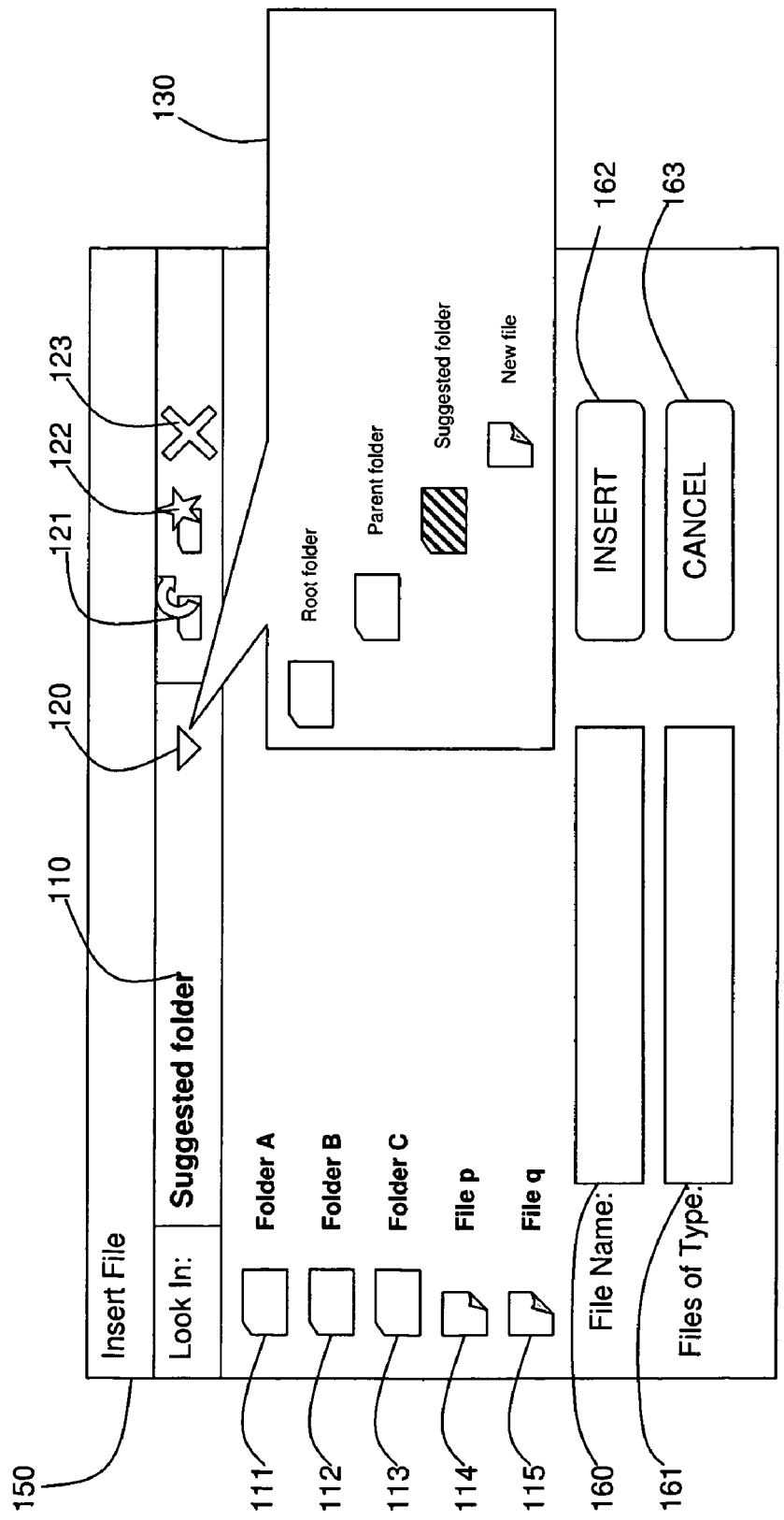
FIG. 1B is an illustration of another embodiment of a graphical user interface for a file browser application as known in the prior art.

As an examples, the graphical user interfaces (GUI) of a file browser as used in Windows operating systems are shown in FIGS. 1A and 1B. In FIG. 1A, a browse window 100 for a "Save As" operation is shown. In FIG. 1B, a browse window 150 for an "Insert file" operation is shown.

FIG. 1A shows a browse window 100 with a suggested folder 110 with the folders 111-113 and files 114-115 within the suggested folder 110 listed. The suggested folder 110 has an expand button 120 to show its location in the folder hierarchy of the file system 130 in order to select a different folder in the hierarchy to change the suggested folder 110, if required. In this way, a user can browse through folders in the file system 130 to select the required folder.

The browse window 100 also generally includes other means of navigating around the file system including means for going up a level 121 in the hierarchy from the suggested folder 110 and tools such as means for creating a new folder 122, or means for deleting a file or folder 123.

The browse window 100 also includes an input box 140 for entering a file name and a selection means for a type of file 141, a save button 142, and a cancel button 143.

Once a folder is chosen in the suggested folder 110, a file name 140 and file type 141 are added and the file is saved by activating the save button 142.

FIG. 1B is similar to FIG. 1A but is used for browsing folders to select a file for inserting. FIG. 1B shows a browse window 150 with a suggested folder 110 with the folders 111-113 and files 114-115 within the suggested folder 110 listed. The suggested folder 110 has an expand button 120 to show its location in the folder hierarchy of the file system 130 in order to select a different folder in the hierarchy to change the suggested folder 110, if required.

The browse window 150 also generally includes other means of navigating around the file system including means for going up a level 121 in the hierarchy from the suggested folder 110 and tools such as means for creating a new folder 122, or means for deleting a file or folder 123.

The browse window 150 also includes an input box for entering a file name 160. The browse window 150 also includes a selection means for restricting to looking for files of selected types 161. The browse window 150 has an insert button 162 and a cancel button 163.

Once a folder is chosen as the suggested folder 110, a file name 160 is added and the file is inserted by activating the insert button 162.

Figure 2:
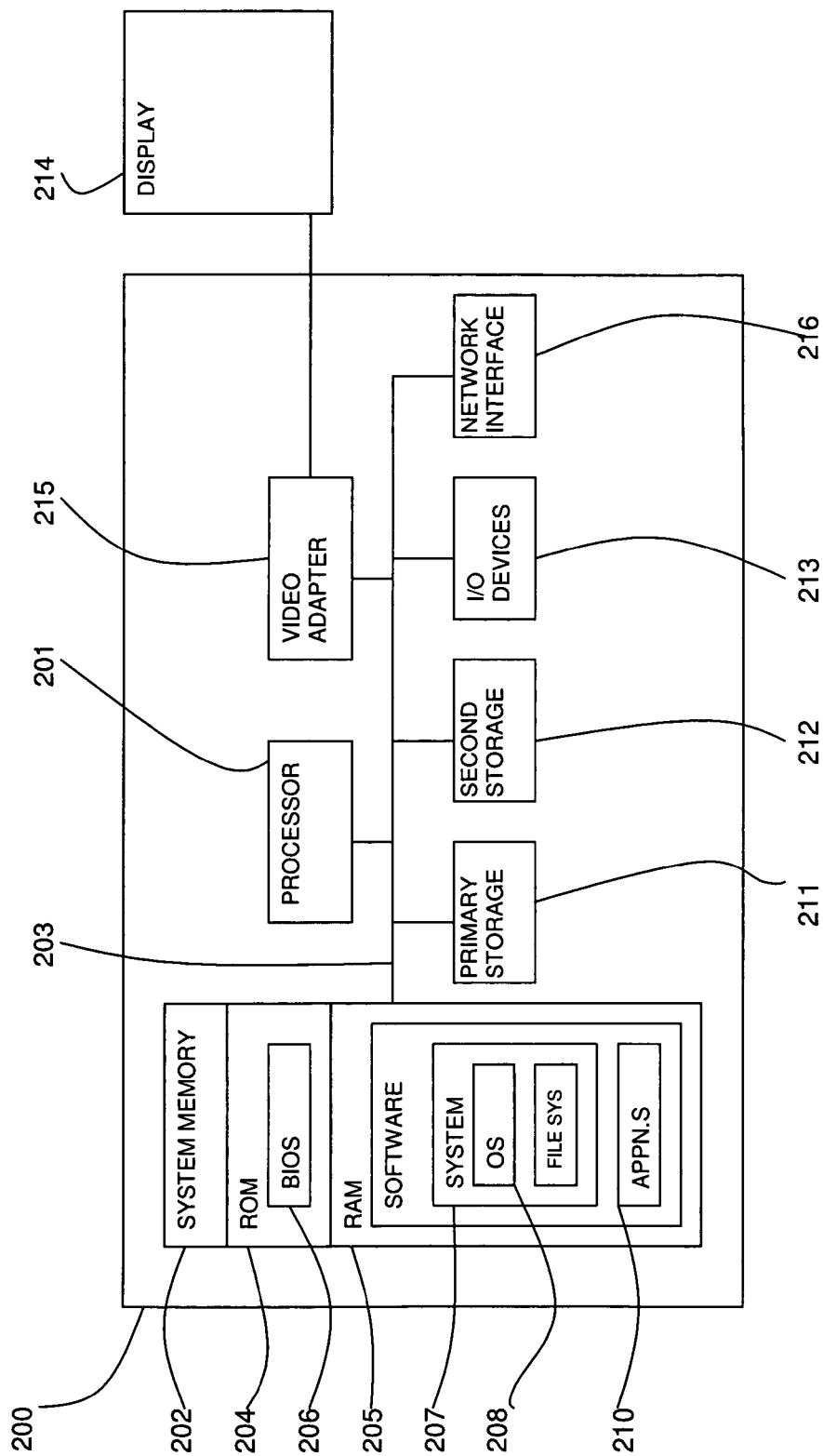
FIG. 2 is a block diagram of a computer system in which the present invention may be implemented.

Referring to FIG. 2, an exemplary system for implementing the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. A file system 209 associated with or included in the operating system 208 may also be stored in RAM 205. Software applications 210 may also be stored in RAM 205 which interface with the operating system 208 and file system 209 through application programming interfaces (APIs). The software applications 210 may include a file browser application with its associated GUI.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
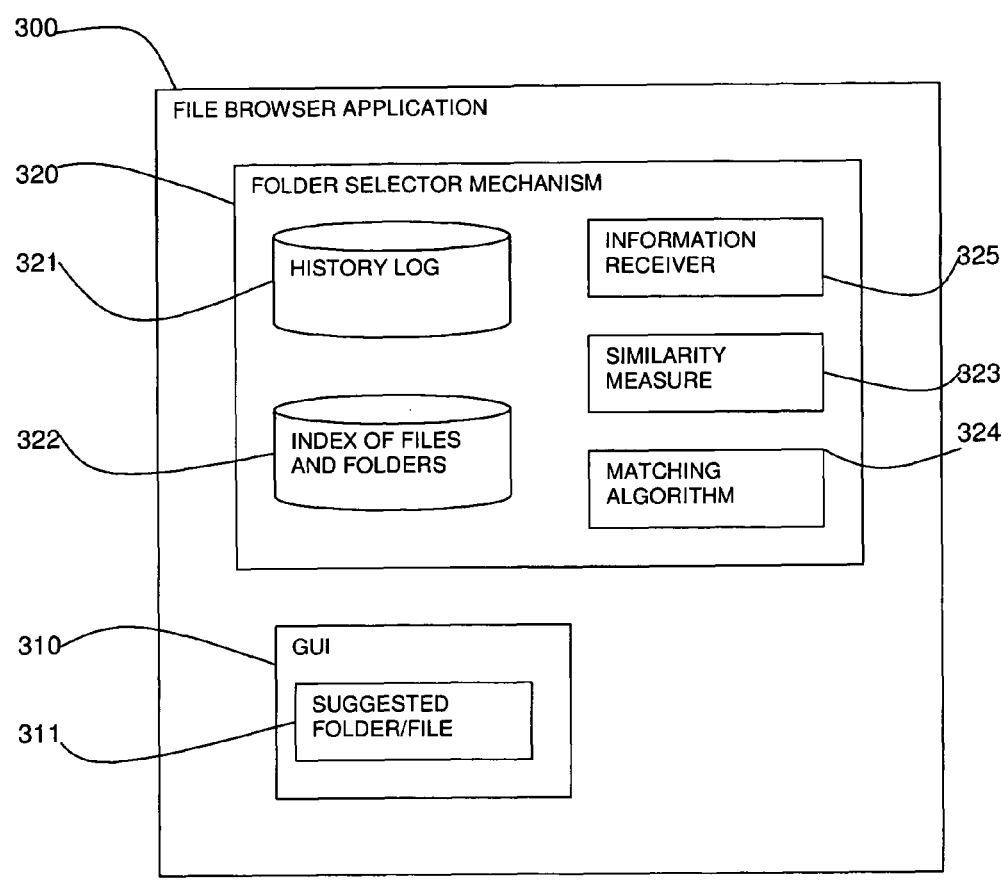
FIG. 3 is a block diagram of a system in accordance with the present invention.

Referring to FIG. 3, a block diagram shows a system in accordance with the present invention in the form of a file browser application 300. The file browser application 300 includes a GUI 310 which may be of the form shown in FIGS. 1A and 1B, or may be of a different form. The GUI 310 includes a display of a suggested folder 311 as a starting point for navigation of a file system.

The file browser application 300 includes a folder selection mechanism 320 which includes a history log 321 including data relating to the history of file locating actions.

The folder selection mechanism 320 also includes an index 322, or access to an index held elsewhere, of the files and folders in the file system. The index 322 may alternatively hold a preferred list of folders defined by a user.

The folder selection mechanism 320 includes a means for receiving information 325 relating to an operation being carried out for which folder suggestions are required. The information may relate to file information, file source information, or file destination information depending on the operation.

The folder selection mechanism 320 further includes a similarity measure 323 for comparing file names, content and history. The folder selection mechanism 320 further includes a matching algorithm 324 for determining a suggested folder from the data of the history log 321, index 322 and similarity measure 323.

In order to explain the described system and method fully, three example embodiments are used.

The first embodiment is provided in the context of an email message system in which an attachment has been received in an email message. The user wishes to extract the attachment from the message to a folder in the file system. The file browser application is used to select a folder to extract the message attachment to.

The second embodiment is provided in the context of saving a file to a folder for example in the context of a file editor application in which the file is a text document (e.g., a Word document), or an internet browser application in which the file is a web page.

The third embodiment is provided also in the context of an email message system in which an attachment is selected for adding to an email message from a folder.

The system provides automatic analysis of the available information and suggests a folder (or a list of folders, ordered by priority) based on the history of previous similar operations, the context of the file to be saved or inserted, and the existing folders.

The information available for use will vary depending on the situation as will be shown in the three embodiments, but this is generally based on some or all of the following.

History data including:
  operation history: history of folders to which files have been saved or from which files have been selected; the file information: file name, content, including image and voice content.

File information including:
  file system folders and hierarchy: folder names, names of files in folders;
  metadata relating to the file: e.g. file author and author information.

Source information, from where a file is being retrieved, including:
  in the case of email contexts:
    the email information: sender, email title, email content, email distribution list if it exists;

Destination information, to which a file is being sent, including:
  in the case of email contexts:
    the email information: sender, email title, email content, email distribution list if it exists;

Based on the information, the suggested method and system will find a recommendation of a folder(s) for a file and will suggest it to the user as the default folder (or will present to the user a list of folders, ordered by priority, to select from).

The following definitions are used in the described method of folder suggestion.

History:

The history of file operations saved in the history log of the described folder selection mechanism may include:
  the date of the operation;
  the name of the file;
  the folder to which the file was extracted; and
  other file metadata including: in the case of the email context, the subject of the email from which the file was extracted.

Similarity:

The similarity measure used in the described folder selection mechanism may include the following measures. The similarity between texts is measured as a distance measure (for example, Levenstein distance, or other distance measurement methods). A predefined threshold of distance is defined for similarity between texts. This distance can define the degree of similarity. All subsequent references to similarity use such a distance threshold measure.

1. File Name to File Name.

A file name is similar to another file name if the distance between the two names is under a predefined threshold. This distance can define the degree of similarity.

For example, the file name "presentation_to_eric_visit-.doc" is similar to the file name "presentation_to_eric_visit1.doc", but less similar to (i.e., with a higher distance from) the file name "presentation.doc".

2. Name to Text.

A name (e.g., of a folder) is similar to a text (e.g., a subject of an email) if the text includes n occurrences of the name (possibly in different inflictions), where n is equal or above a predefined threshold. The number of occurrences defines the similarity level.

For example, assume the threshold is 1, then the folder name "Internal Projects" is similar to the email subject "An update on the Fox Internal Project", but is not similar to the email subject "An update from the Fox team". However, still with threshold of 1, the folder name "Fox" is similar to the email subject "An update on the Fox Internal Project", as well as to the email subject "An update from the Fox team".

3. File Name to History.

A file name is similar to an entry in the history if the file name is similar to the file name in the history entry or similar to the folder name in the history entry. As defined above, a file name is similar to another file name if the distance between the two names is under a predefined threshold. This distance can define the degree of similarity.

For example, the file name "Fox.ppt" is similar to the history entry which described that on Dec. 31, 2006, the file "Fox.ppt" was extracted to the folder "ABC". Also, the file name "Fox.ppt" is also similar to the history entry which described that on Jan. 1, 2007, the file "CDE.txt" was extracted to the folder "Fox".

Matching:

The matching used in the matching algorithm of the described folder selection mechanism may include the following matching operations. References to "matching" in this description use one of these forms of matching operations.

1. File Name to Folder

A file name matches a folder if the folder contains a file with a similar name. Similarity is as defined above.

For example, the file name "Fox.ppt" matches the folder "Projects" if this folder contains a file with the name Fox.ppt (or alternatively with the name Fox.*).

2. Folder to Email Message.

A folder matches an email if the folder name is similar to the email subject or to the email text. Again, similarity is measured as defined above.

For example, the folder "Projects" matches an email with the subject "Progress report on Project Fox". Another example: the folder "Fox" matches an email with the text body that includes three occurrences of the word "Fox", where the threshold is 3 or lower.

3. File Name to Folder by History

A file name matches-by-history a folder if the history includes n entries for which the file name is similar to, where n is equal or above a predefined threshold. The number of entries defines the similarity level.

For example, the file name "Fox Progress Report 3 2007.doc" matches-by-history the folder "ABC" if the history includes two entries (assuming the threshold is 2 or lower) where one entry describes that the file "Fox Progress Report 2 2007.doc" was extracted to the folder "ABC" on Jan. 3, 2007 and the file "Fox Progress Report 1 2007.doc" was extracted to the folder "ABC" on Jan. 2, 2007.

In the first embodiment, of extracting an email message attachment from the message to a folder in the file system, the following algorithm is used in the matching algorithm of the described folder selection mechanism.

The folder FL will be suggested by the following algorithm using the definitions given above. The folder FL will be suggested as the default folder for extracting the file F from email E if:
  file F matches-by-history folder FL (if file F matches-by-history more than one folder, the best match in terms of number of entries will be selected);
  else, if there is a single folder FL where file F matches folder FL (i.e., file F does not match any other folder);
  else, if folder FL matches email E (if there is more than one folder that matches email E, the folder with the highest similarity level will be suggested as folder FL).

Figure 4:
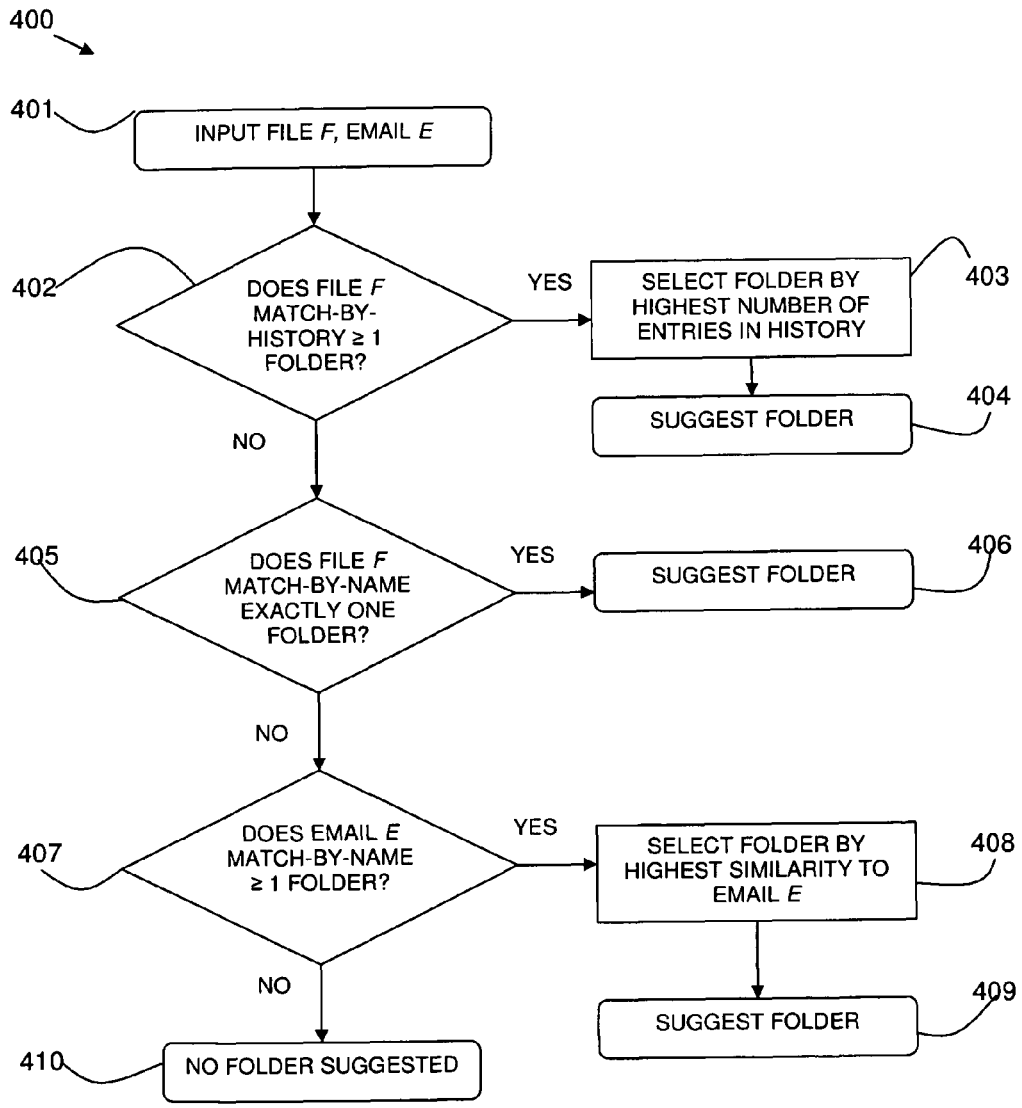
FIG. 4 is flow diagram of a first embodiment of a method in accordance with the present invention.

FIG. 4 is a flow diagram 400 showing a method used in the first embodiment. The method starts with an input 401 of the file F and email E. The file F information includes the file name and file contents, if available. The email E information includes the email title, email content, email sender, and email distribution list, if available.

The method determines 402 if the file F matches-by-history one or more folders. The match-by-history of a file to a folder checks if the history includes n entries which the file name is similar to, where n is equal or above a predefined threshold. The number of entries defines the similarity level.

If there are one or more folders which match the file F, the folder is selected 403 by the highest number of entries n in the history. The selected folder is suggested 404 as the folder for extraction of the file F.

If the file does not match-by-history any folders, it is determined 405 if the file F matches-by-name exactly one folder. A file name matches a folder if the folder contains a file with a similar name. If there is exactly one folder, the folder is suggested 406 as the folder for extraction of the file F.

If the file does not match-by-name exactly one folder, i.e. it matches more than one folder or no folders, then it is determined 407 if the email E in which the file F has been received matches-by-name one or more folders. A folder matches an email if the folder name is similar to the email subject or to the email text.

If the email E matches-by-name one or more folders, the folder is selected 408 by the highest similarity to the email E. The selected folder is suggested 409 as the folder to which the file F is to be extracted.

If the email E does not match-by-name a folder, no folder is suggested for extraction. In this case default settings for the suggested folder are used, for example, the last folder a file was extracted to, or a user preferred folder for file extraction in the event of no suggestions.

EXAMPLE

The attachment "Fox Progress Report 3 2007.doc" is considered in an email with the subject "Progress report for the Fox project for 3/2007".

The algorithm will suggest the folder "Fox progress reports" if the history has two entries that show that the file "Fox Progress Report 2 2007.doc" was once extracted to this folder and the file "Fox Progress Report 1 2007.doc" was once extracted to this folder (assuming two or lower is the threshold).

Now, assume the history does not include such entries, then the algorithm will suggest the folder "Fox progress reports" because this folder contains the files "Fox Progress Report 1 2007.doc" and "Fox Progress Report 2 2007.doc" which make the folder similar to the file name.

In this case, it is assumed that the algorithm has access to a searchable index of all the files together with the folders in which they are saved. Alternatively, a preferred list of folders defined by the user is accessed.

Now, assume this folder does not contain these files, then the algorithm will suggest the folder "Fox progress reports" because this folder matches the email, i.e., it is similar to the email subject (threshold=1).

The algorithm may suggest more than one folder, if in any stage of the algorithm more than one folder satisfies the conditions. In that case, the folders that satisfy the conditions will be presented in a decreasing order of similarity level, as defined above.

The second embodiment of saving a file has a method similar to the method of the first embodiment with the difference that email information is not available, only the file information.

A folder FL will be suggested by the following algorithm as the default folder for saving the file F if:
  F matches-by-history FL (if F matches-by-history more than one folder, the best match in terms of number of entries will be selected);
  else, if there are one or more folders FL where file F matches FL (if there is more than one folder that matches F, the folder with the highest similarity level will be suggested as FL).

Figure 5:
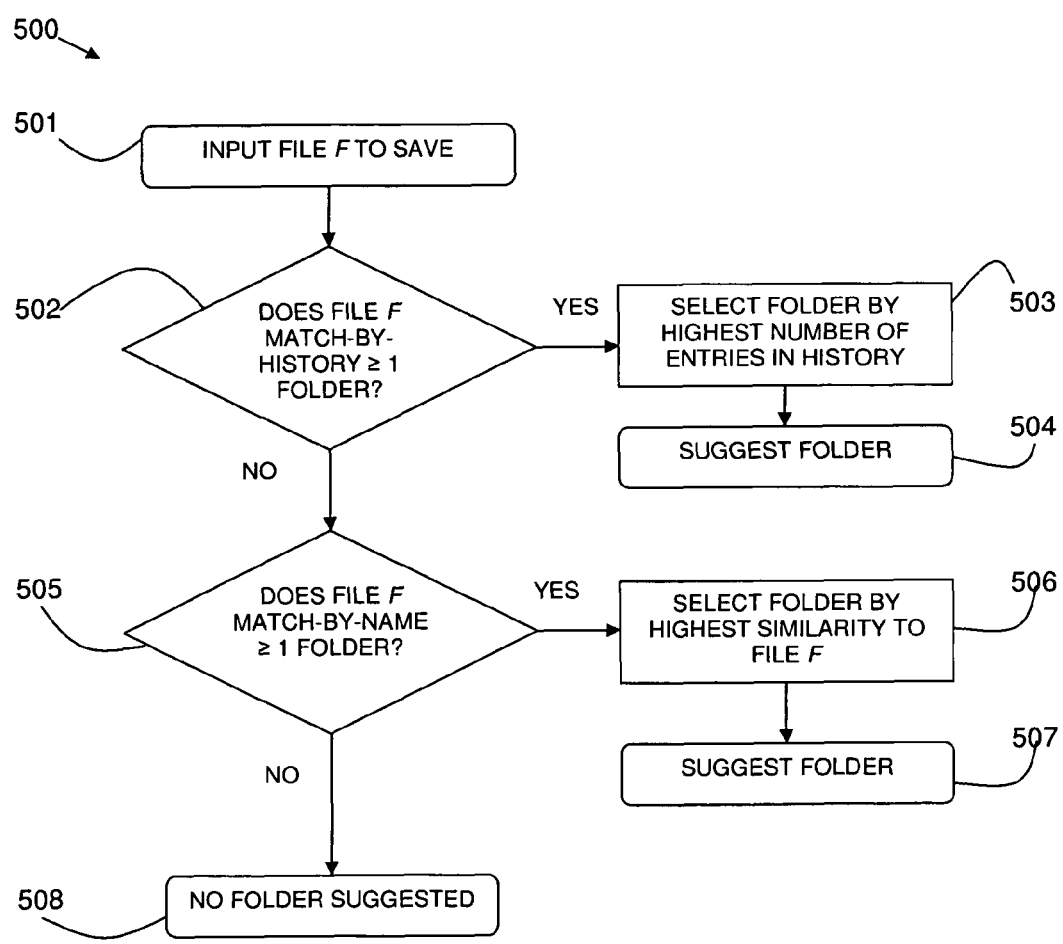
FIG. 5 is a flow diagram of a second embodiment of a method in accordance with the present invention.

FIG. 5 is a flow diagram 500 showing a method used in the second embodiment. The method starts with an input 501 of the file F. The file F information includes the file name and file contents, if available.

The method determines 502 if the file F matches-by-history one or more folders. The match-by-history of a file to a folder checks if the history includes n entries which the file name is similar to, where n is equal or above a predefined threshold. The number of entries defines the similarity level.

If there are one or more folders which match the file F, the folder is selected 503 by the highest number of entries n in the history. The selected folder is suggested 504 as the folder for extraction of the file F.

If the file does not match-by-history any folders, it is determined 505 if the file F matches-by-name one or more folders. A file name matches a folder if the folder contains a file with a similar name. If there are one or more folders, the folder is selected 506 by highest similarity to the file F. The selected folder is suggested 507 as the folder for extraction of the file F.

If the file does not match-by-name any folders, then no folder suggestion 508 is made. Again, a default folder suggestion may be used.

The third embodiment is a file retrieval operation. In retrieval operations, for example, attachment of a file to an email, the method looks for similar retrieval operations, as opposed to previous file information, where 'similar' is decided by the target or destination. For example, if a user is writing an email and wants to attach (i.e., retrieval operation) a file into the email, the method looks for similar attach operations where similarity is in a similar email destination (e.g., subject or addressees).

The third embodiment of selecting a file F for adding as an attachment to an email E may use the following algorithm:
  search for all the folders FL that match email E;
  in descending order of similarity level, for each such folder FL, search the files in FL for files F that are similar to the subject of email E or the text in email E and suggest file F;
  else, if there is no folder FL that matches email E then search all folders FL in history from which files were attached and for each folder FL do the same.

Figure 6:
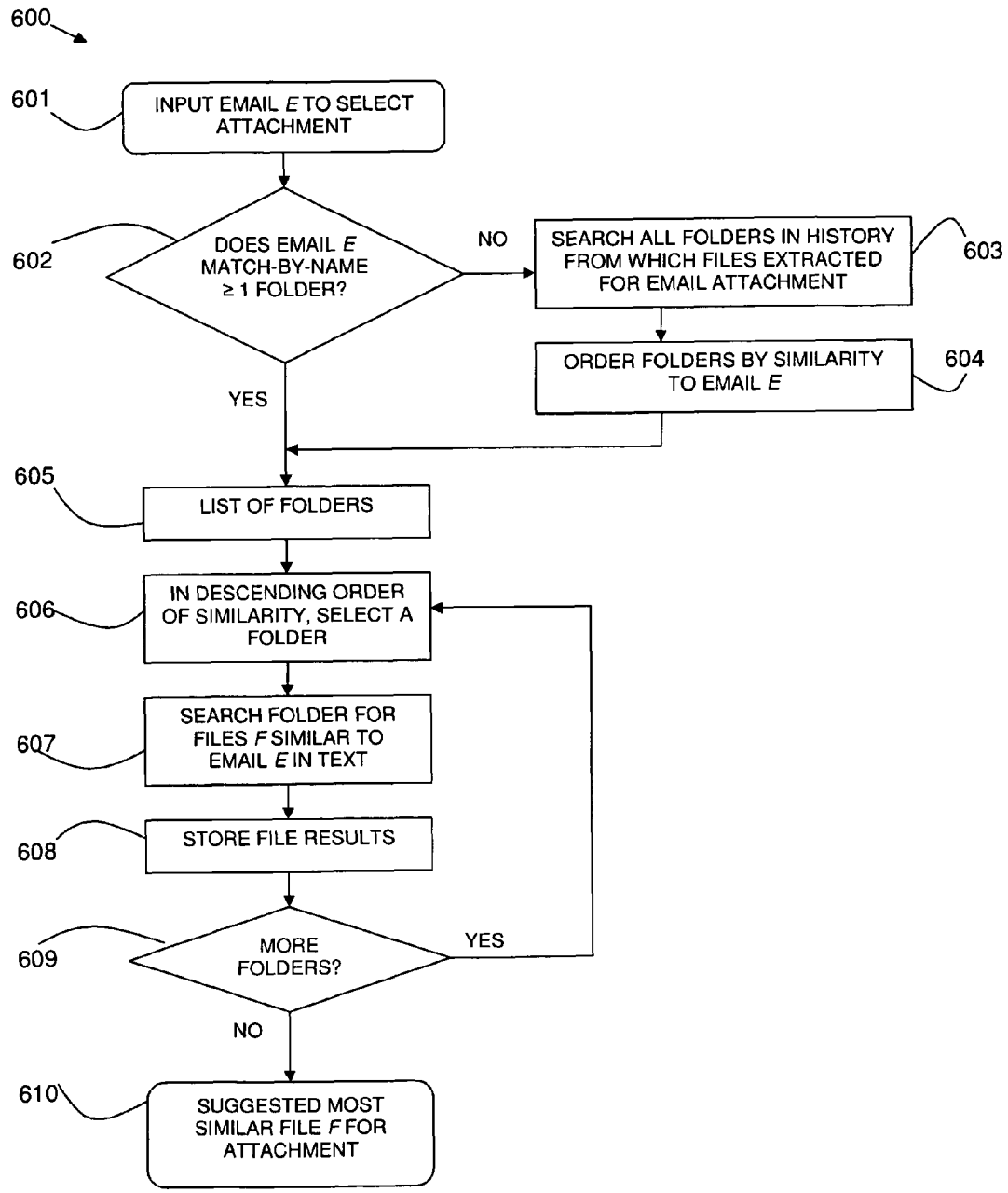
FIG. 6 is a flow diagram of a third embodiment of a method in accordance with the present invention.

FIG. 6 is flow diagram 600 showing a method used in the third embodiment. The method starts with an input 601 of the email E for which a file is required to be selected for attachment. The email E information includes the email title, email content, email sender, and email distribution list, if available.

The method determines 602 if the email E matches-by-name one or more folders. If there are no folders that match-by-name the email E, then the method searches 603 for all folders in the history from which files have been selected for email attachment. The folders are sorted 604 by similarity to the email E.

In both cases, a list of folders is provided 605 in descending order of similarity to the email E. In descending order of similarity of folder to email E, a folder is selected for processing 606. The folder is searched 607 for files F similar to email E in text. The file results are stored 608.

It is then determined 609 if there are more folders to process. If there are more folders to process, the method loops to step 606 of selecting the next folder for processing in descending order of similarity to email E. The next folder is processed and the file results again stored.

If there are no more folders at step 609, the most similar file F from the stored results is suggested for attachment to the email.

The order of the matching steps of the algorithms may be changed to optimise for a given application.

A user may override any suggestion for folder selection and the actual action of the operation relating to a folder is stored in the history log thus affecting future suggestions.

A folder selection mechanism, alone or as part of a file browser, may be provided as a service to a customer over a network.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for folder recommendation, comprising:
    receiving a user request for a file save operation, the file save operation comprising saving a subject file to a folder of a file system having a plurality of folders, the folders having respective folder names, and the subject file having subject file information comprising one or more of a subject file name, subject file contents, and subject file metadata, wherein the file save operation is to be carried out from a source having source information comprising one or more of a source subject, source content, sender, and distribution list;
    providing history data of one or more previous file save operations, the history data including details of the previous file save operations and respective historical folders of the file system on which the one or more previous file save operations were performed;
    making a negative first determination that no match-by-history exists between the respective historical folders and the subject file information;
    making a negative second determination that no match-by-name exists between the subject file and exactly one folder of the file system; and
    responsively to the negative first determination and the negative second determination identifying a similar folder of the file system as a recommended folder for the file save operation.

2. The method according to claim 1, wherein making the first determination comprises a determination that the history data includes at least a predetermined number of entries that are similar to the subject file name.

3. The method according to claim 1, wherein the first determination, the second determination and an identification of the most similar folder comprise a measurement of a degree of similarity of two texts.

4. The method according to claim 3, wherein the measurement of a degree of similarity comprises computing a distance measurement between texts.

5. The method according to claim 4, wherein the distance measurement is a Levenstein distance.

6. The method according to claim 1, wherein the first determination comprises matching the file save operation to one or more of the historical folders based on a number of entries in the history data that are similar to the subject file information to establish the match-by-history.

7. The method as claimed in claim 1, wherein identifying a similar folder comprises presenting a plurality of similar folders in a decreasing order of similarity for selection thereof.

8. The method as claimed in claim 1, wherein the source information further comprises an e-mail message subject, message content, and e-mail addresses for an e-mail message from which an attached file is retrieved for saving in the file save operation.

9. A method for folder recommendation, comprising:
    receiving a user request for a file save operation, the file save operation comprising saving a subject file to a folder of a file system having a plurality of folders, the folders having respective folder names, and the subject file having subject file content information, wherein the file save operation is to be carried out from a source having source content information;
    providing history data of one or more previous file save operations, the history data including details of the previous file save operations and respective historical folders of the file system on which the one or more previous file save operations were performed;
    making a first search to determine whether at least one match-by-history exists between the respective historical folders and the subject file content information;
    making a second search to determine whether a match-by-name exists between the subject file content information and exactly one folder of the file system;
    identifying one of the respective historical folders and the exactly one folder as a recommended folder for the file save operation when the first search discovers the at least one match-by-history or when the second search discovers the exactly one folder;
    signaling a failure when the first search fails to discover the at least one match-by-history and when the second search fails to discover the exactly one folder; and
    responsively to the signaled failure identifying a most similar folder of the file system as the recommended folder, wherein the folder name thereof has a greatest similarity to the source content information.

10. The method according to claim 9, wherein making a first search, making a second search and identifying a most similar folder are performed by measuring a degree of similarity of two texts that is less than an identity therebetween.

11. The method according to claim 10, wherein measuring a degree of similarity comprises computing a distance measurement between the two texts.

12. The method according to claim 11, wherein the distance measurement is a Levenstein distance.

13. The method according to claim 9, wherein making a first search comprises determining that the history data includes at least a predetermined number of entries wherein names of at least one of the historical folders are similar to the subject file content information.

14. The method as claimed in claim 9, wherein the source content information further comprises an e-mail message content, of an e-mail message from which an attached file is retrieved for saving in the file save operation.

15. A method for folder recommendation, comprising:
   receiving a user request for a file save operation, the file save operation comprising saving a subject file to a folder of a file system having a plurality of folders, the folders having respective folder names, and the subject file having subject file information comprising one or more of a subject file name, subject file contents, and subject file metadata, wherein the file save operation is to be carried out from a source having source information comprising one or more of a source subject, source content, sender, and distribution list;
   providing history data of one or more previous file save operations, the history data including details of the previous file save operations and respective historical folders of the file system on which the one or more previous file save operations were performed;
   making a first search to determine whether at least one match-by-history exists between the respective historical folders and the subject file information;
   making a second search to determine whether a match-by-name exists between the subject file and exactly one folder of the file system, wherein making a first search, and making a second search are performed by searching for a similarity match comprising measuring a degree of similarity of two texts that is less than an identity therebetween;
   identifying one of the respective historical folders and the exactly one folder as a recommended folder for the file save operation when the first search discovers the at least one match-by-history or when the second search discovers the exactly one folder; and
   signaling a failure when the first search fails to discover the at least one match-by-history and when the second search fails to discover the exactly one folder; and
   responsively to the signaled failure identifying a most similar folder of the file system as the recommended folder, wherein the folder name thereof has a greatest similarity to the source information.

16. The method according to claim 15, wherein making a first search comprises determining that the history data includes at least a predetermined number of entries that are similar to the subject file name.

17. The method according to claim 15, wherein measuring a degree of similarity comprises computing a distance measurement between the two texts.

18. The method according to claim 17, wherein the distance measurement is a Levenstein distance.

19. The method according to claim 15, wherein the first search comprises matching the file save operation to one or more of the historical folders based on a number of entries in the history data that are similar to the subject file information to establish the match-by-history.

20. The method as claimed in claim 15, wherein the source information further comprises an e-mail message subject, message content, and e-mail addresses for an e-mail message from which an attached file is retrieved for saving in the file save operation.

* * * * *